# United States Patent [19]

Rieger

[11] 3,768,536
[45] Oct. 30, 1973

[54] TIRE CHAIN
[76] Inventor: Hansjorg Rieger, Langerstrasse 90, Aalen/Wurtt, Germany
[22] Filed: Nov. 12, 1971
[21] Appl. No.: 198,234

[30] Foreign Application Priority Data
Nov. 13, 1970 Germany.................. P 20 56 838.1

[52] U.S. Cl. .............................................. 152/239
[51] Int. Cl. ........................................... B60c 27/06
[58] Field of Search.................... 152/170, 171, 172, 152/173, 174, 175, 239, 244

[56] References Cited
UNITED STATES PATENTS
1,513,266    10/1924    Oldfield............................ 152/172
1,019,830    3/1912    Pejchar.............................. 152/171

*Primary Examiner*—James B. Marbert
*Attorney*—D. Verner Smythe et al.

[57] ABSTRACT

An anti-skid tire chain having horizontal and vertical links wherein the vertical links have a cross-sectional area which is greater than a round link of the same inside and outside diameter and where the horizontal links have a section modulus which is greater about its main axis in the plane of the link than the section modulus about the main axis of the link perpendicular to the plane of the link.

10 Claims, 8 Drawing Figures

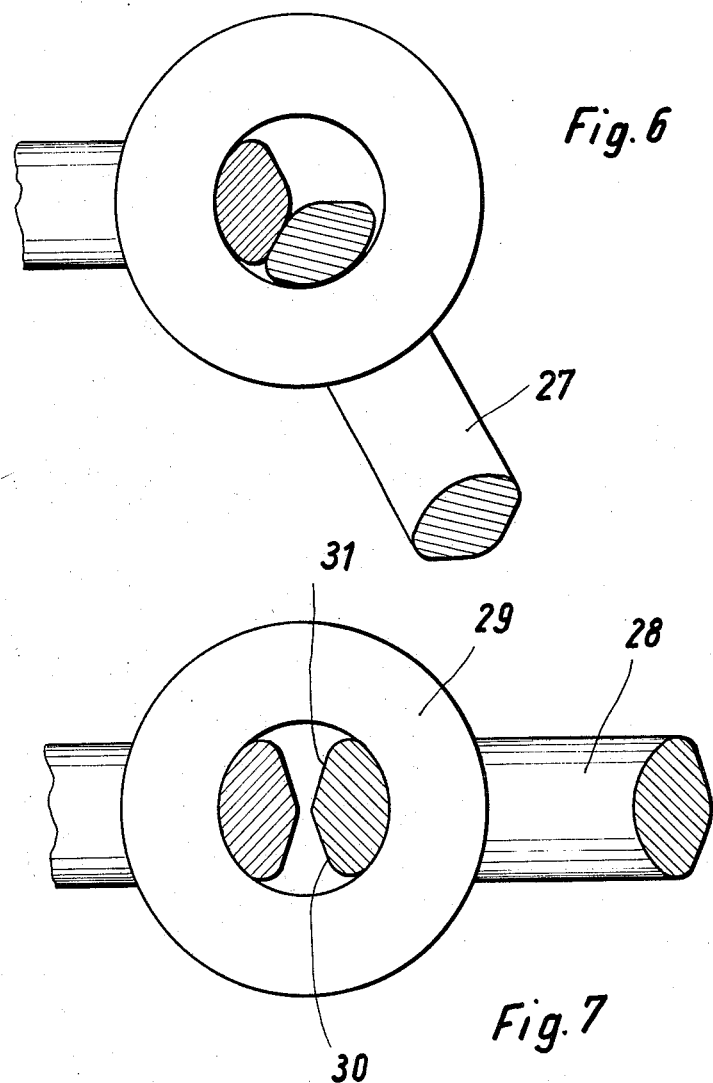

TIRE CHAIN

The present invention relates to a tire chain of circular, horizontal and vertical links in which at least the vertical links preferably have a cross section which in order to increase their wear volume or volume available for wear or abrasion is greater than the circular cross section of round links of the same outside and inside diameters.

Tire chains of the above type are known in which the horizontal links consist of rings of circular cross section. The determining factor for the selection of such horizontal links, is, on the one hand, the fact that such links can be made very cheaply from round-wire material and, on the other hand, the fact that the cross-sectional shape of the horizontal links was thought in general to be of minor importance because they do not ordinarily come into contact, or at least come far less into contact, than the vertical links with the ground on which the vehicle is moving.

Ring-shaped horizontal links of a cross section, other than circular, are known from a chain formed of plate-shaped straps and ring members in which the horizontal links are not closed by welding, during the manufacture of the chain, but are suspended in closed condition into slots and then locked in the latter by plastic deformation of the ends of the slots. In the second known type of chain, one endeavors, in order to avoid an undesirable great weakening of the straps, to keep the height of the slots in the straps as small as possible, and therefore in this case there are used only horizontal links whose cross-section length perpendicular to the plane of the ring is at most equal to the cross-section length in the plane of the ring.

The invention is based on the discovery that, in the case of anti-skid chains of the first mentioned known type, horizontal ring members of circular cross section, particularly when there are concerned heavy constructions, i.e. chains having large links, are less suitable since the tendency of the vertical links to tilt and the forces exerted by the tilting vertical links on the horizontal links lead to undesirably high flexural stresses in the horizontal links.

One of the objects of the present invention is to do away with the foregoing deficiencies and to create an anti-skid chain of the aforementioned type, whose vertical links are characterized by increased resistance to tilting as a result of a shaping of the horizontal links which guarantees good support.

This object is attained in accordance with the invention in the manner that the section modulus of the cross section of the horizontal chain links around its main axis lying in the link plane is greater than the section modulus around its main axis which is perpendicular to the plane of the link.

The tire chain in accordance with the invention provides the assurance that its horizontal links can withstand without danger the flexural forces introduced into them by the vertical links. The exceptional cross-sectional shape of the horizontal links makes it furthermore possible to keep the outside diameter of the horizontal links relatively small and thereby obtain on the one hand particularly favorable nodal-point proportions and on the other hand to assure a high network density even in the case of chains having large links. Finally, the resistance to wear of the chain network can also be increased.

The invention will be explained in further detail with reference to the accompanying drawing.

In the drawing:

FIGS. 3 to 7 show sections, corresponding to the section of FIG. 2, of the horizontal links of modified cross-sectional shapes.

Figures 1, 2:
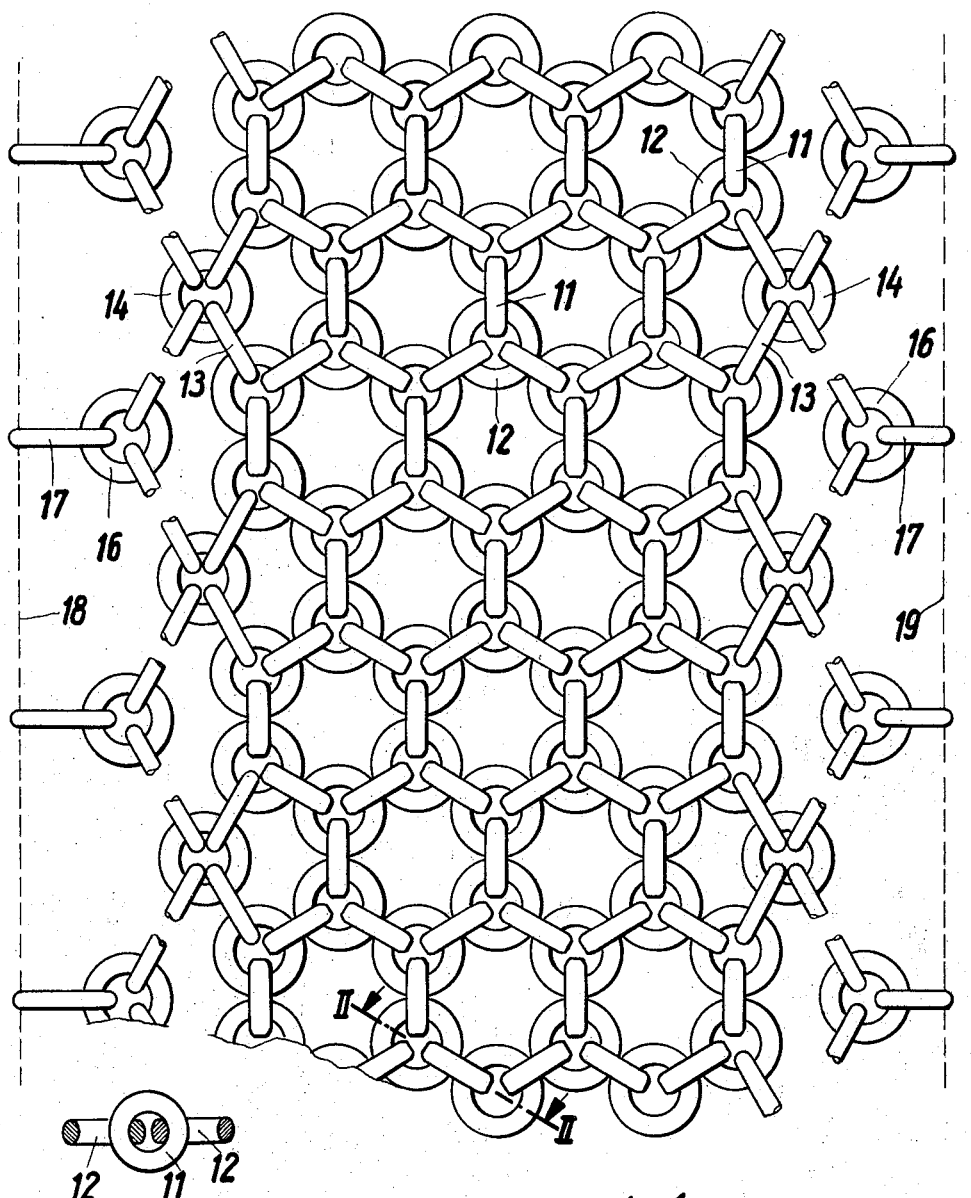
FIG. 1 is a top view of a part of an anti-skid chain in accordance with the invention.
FIG. 2 is a section along the line II—II of FIG. 1.

The chain network in accordance with FIG. 1 consists of vertical links 11 having a profile cross section which is larger than the cross section of round links of the same outside and inside diameter. The circular vertical links 11 are connected with each other by horizontal links 12 which are also circular. To each horizontal link 12 there are attached three vertical links. At the edges of the network formed by the links 11 and 12, the network is connected via oval round links 13 with ring links 14, the cross section of which can be circular. From the ring links 14, chain strands extend to further ring links 16 which are connected via oval links 17 with the side chains 18, 19.

FIG. 2 shows a section through two horizontal links 12 of the chain network shown in FIG. 1 and a side view of a vertical link 11 connecting the horizontal links. As can be seen, the horizontal links have an elliptical cross section which is so shaped that line contact takes place at the contact surfaces between the horizontal links and the vertical link. The cross section (not shown) of the vertical links 11 is substantially barrel-shaped, the radius of curvature of the side of the vertical link 11 facing the inner surface of the horizontal link 12 having the same size as the inner radius of the horizontal link 12.

Figure 3:
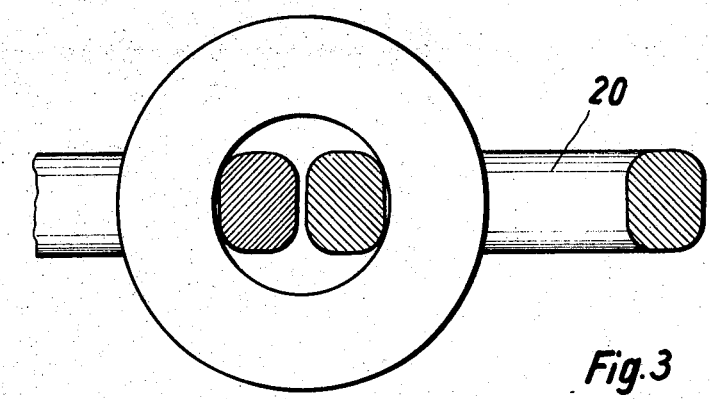

FIG. 3 shows horizontal links 20 which are produced by slightly squeezing the link of circular cross section. The thickness of these links, considered in the link plane, is about 10 to 20 percent less than the diameter of the circular starting material.

Figure 4:
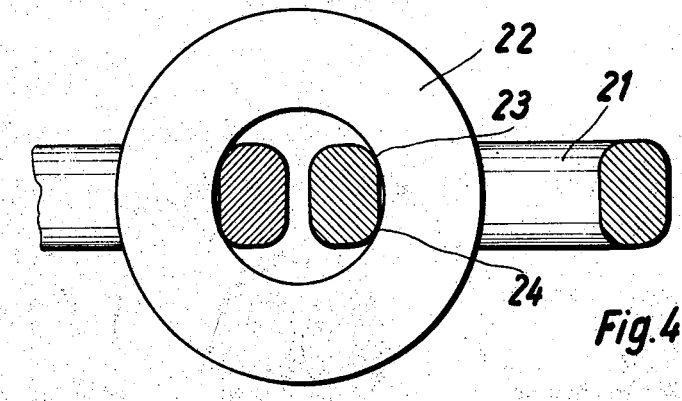

The horizontal links 21 in FIG. 4 have a cross section which corresponds to a rectangle with rounded corners. With this cross-sectional shape a point contact is obtained between the horizontal link 21 and the vertical link 22 at the points 23 and 24.

Figure 5:
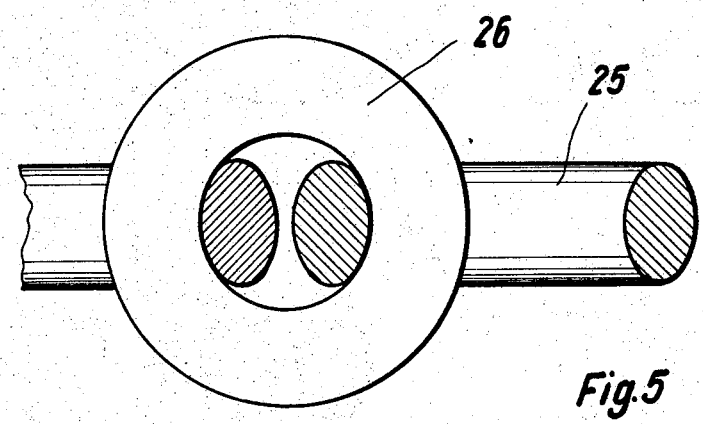

FIG. 5 shows the cross section through an elliptical horizontal link. The curvature on the inside of this horizontal link 25 is so selected that good contact conditions are present between the horizontal link 25 and the vertical link 26.

The horizontal links 27 of FIG. 6 have a cross section of similar shape to the cross section of the horizontal link 25 shown in FIG. 5.

FIG. 7 shows horizontal links 28 having a semi-circular inner wall, the radius of the semi-circle corresponding to half the inside diameter of the vertical link 29. On the outside, the horizontal links 28 have roof surfaces 30, 31 which upon the moving of the link at an angle strike against corresponding surfaces on the next following link, as indicated in FIG. 6. In the plane shown in FIG. 7, the vertical and horizontal members contact each other along a circular line. By suitable shaping of the vertical links 29, a line contact between the vertical and horizontal links can be brought about also in the plane perpendicular to the plane of the drawing so that there is produced at the places of contact, considered as a whole, a surface contact between the different links which is superior with regard to resistance to wear to a point or line contact.

The inside diameter of the horizontal links should preferably be equal to about $3d$, in which $d$ is the diameter of a circular surface corresponding to the cross section of the horizontal link.

Figure 8:
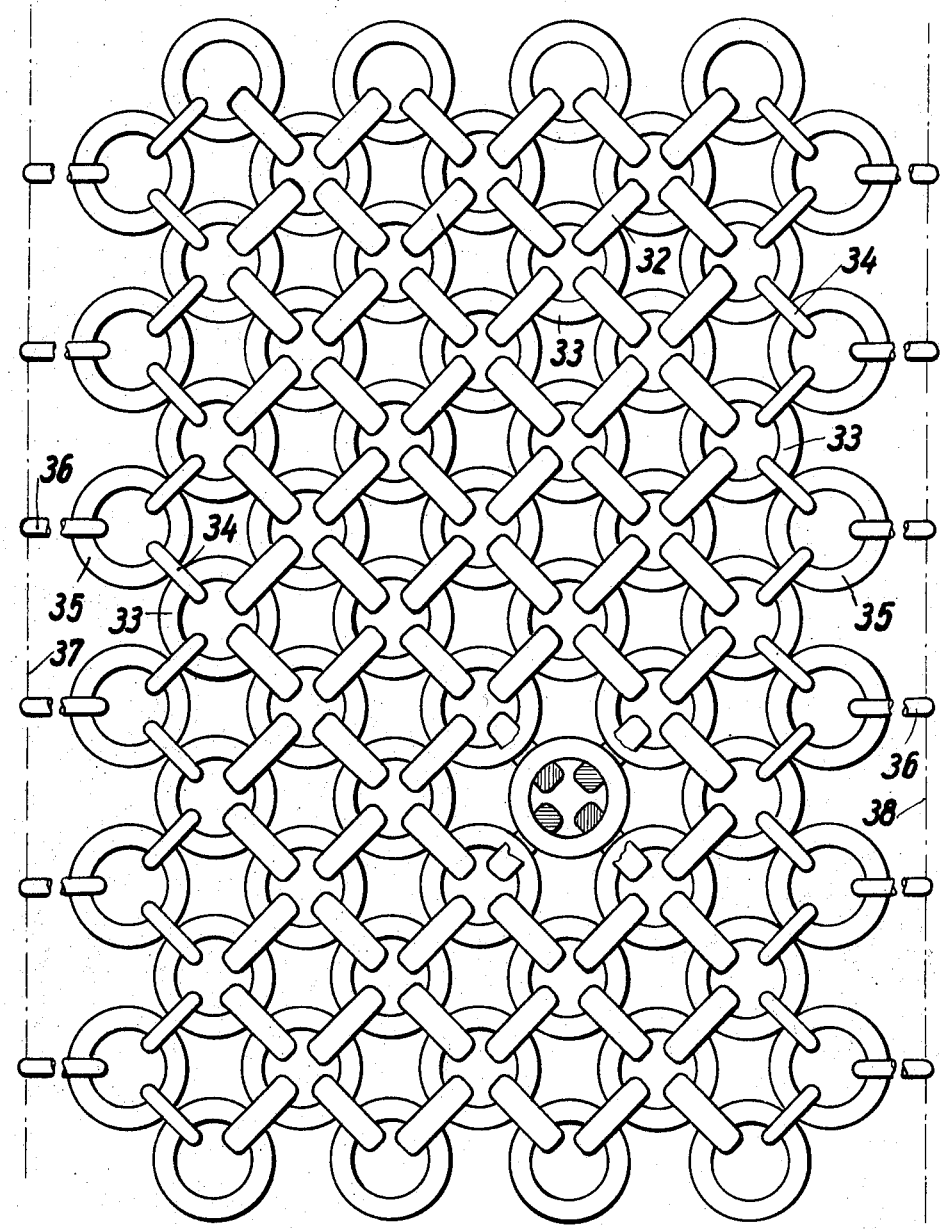
FIG. 8 is a top view of a part of a preferred embodiment.

A cross-sectional shape of the horizontal links in accordance with the invention have proven particularly advantageous in tire anti-skid chains, the network of which had nodal points which are formed by one horizontal link and four vertical links. In these cases, the horizontal link must, of course, have a larger diameter than in the cases in which it is connected only with three vertical links. The larger inside diameter of the horizontal link increases the sensitivity to bending and the importance of counteracting. This increased sensitivity to bending is particularly great. It can be taken into account by the use of horizontal links whose section modulus around the main axis lying in the plane of the link is greater than the section modulus around the main axis perpendicular to the plane of the link. A chain network of the type described, i.e. a chain network of high density in which the advantages of the invention are particularly evident, is shown in FIG. 8 in which 32 is the vertical links and 33 designates the horizontal links. The horizontal links lying on the outside are connected by round links 34 with ring-shaped round links 35 which in their turn are connected via oval links 36 with side chains 37, 38.

The horizontal links shown in the drawings have a higher section modulus than horizontal links of circular cross section. With the increase of the section modulus, there is obtained an increase in the tensile strength of the chain network without simultaneous increase in the structural height of the vertical links. The horizontal links are strengthened without increasing their inside diameter. The solution provided by the invention is thus space saving and weight saving. Due to the fact that the vertical links can have a small inside diameter, the structural height of the tire anti-skid chain can be kept small and a high resistance to rupture obtained. The improved resting or contact conditions between the horizontal links and the vertical links improve the resistance to wear of the chain of the invention. Finally, it may also be mentioned that the horizontal links can be manufactured by the bending and welding of lengths of wire whereby a uniform closed course of the fiber can be obtained which permits good deep carbonization which also has a favorable effect on the wearing behavior.

What is claimed is:

1. A tire anti-skid chain comprising circularly shaped connected horizontal and vertical chain links, the vertical links having cross-sectional areas greater than the cross-sectional areas of round links of the same inside and outside diameters, and the section modulus of a horizontal link around the main axis of a horizontal link lying in the plane of said horizontal link being greater than the section modulus of the main axis of said link which is perpendicular to the plane of said link.

2. A tire anti-skid chain according to claim 1 wherein the horizontal links have a barrel-shaped cross section.

3. A tire anti-skid chain according to claim 1 wherein the cross section of the horizontal links is substantially elliptical.

4. A tire anti-skid chain according to claim 1 wherein the cross section of the horizontal links is essentially semi-circular, the circular section thereof facing the inside of the link.

5. A tire anti-skid chain according to claim 3 wherein line contact is present between the inner surfaces of the horizontal links and the inner surfaces of the vertical links in normal position.

6. A tire anti-skid chain according to claim 4 wherein line contact is present between the inner surfaces of the horizontal links and the inner surfaces of the vertical links in normal position.

7. A tire anti-skid chain according to claim 3 wherein surface contact is present between the inner surfaces of the horizontal links and the inner surfaces of the vertical links in normal position.

8. A tire anti-skid chain according to claim 4 wherein surface contact is present between the inner surfaces of the horizontal links and the inner surfaces of the vertical links in normal position.

9. A tire anti-skid chain according to claim 1 wherein four vertical links act on each horizontal link at least in the region of the threaded network of the chain.

10. A tire anti-skid chain according to claim 1 wherein the vertical links are barrel-shaped in cross section.

* * * * *